United States Patent
Yasue et al.

(10) Patent No.: US 11,120,085 B2
(45) Date of Patent: Sep. 14, 2021

(54) INDIVIDUAL DEVIATION ANALYSIS BY WARNING PATTERN DETECTION

(71) Applicant: INTERNATIONAL BUSINESS MACHINES CORPORATION, Armonk, NY (US)

(72) Inventors: Toshiaki Yasue, Sagamihara (JP); Nobuhiro Hosokawa, Yokohama (JP); Kohichi Ono, Tokyo (JP); Yukiko Hara, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/432,381

(22) Filed: Jun. 5, 2019

(65) Prior Publication Data

US 2020/0387552 A1 Dec. 10, 2020

(51) Int. Cl.
*G06F 16/903* (2019.01)
*G06F 16/9035* (2019.01)
(Continued)

(52) U.S. Cl.
CPC .......... *G06F 16/90344* (2019.01); *G06F 8/33* (2013.01); *G06F 8/427* (2013.01);
(Continued)

(58) Field of Classification Search
CPC .......... G06F 16/90344; G06F 16/9035; G06F 40/30; G06F 8/33; G06F 8/427; G06F 8/436
(Continued)

(56) References Cited

U.S. PATENT DOCUMENTS

| 7,567,958 B1 * | 7/2009 | Alspector .......... G06Q 30/0255 |
| 7,761,471 B1 * | 7/2010 | Lee ..................... G06F 16/2457 |
| | | 707/783 |

(Continued)

OTHER PUBLICATIONS

Hummel et al, "Analyzing Source Code for Automated Design Pattern Recommendation", [Online], 2017, pp. 8-14, [Retrieved from internet on Mar. 26, 2021], <https://dl.acm.org/doi/pdf/10.1145/3121257.3121259> (Year: 2017).*

(Continued)

*Primary Examiner* — S. Sough
*Assistant Examiner* — Zengpu Wei
(74) *Attorney, Agent, or Firm* — Tutunjian & Bitetto, P.C.; Randall Bluestone

(57) ABSTRACT

A computer-implemented method is provided for detecting characteristics of usages of problem expressions for each of multiple authors. The method includes providing, by a hardware processor, a set of regular expression patterns configured to detect the problem expressions. The method further includes detecting, by the hardware processor based on the set of regular expressions, respective sets of the problem expressions which are (i) used in each of multiple analysis units, (ii) associated with a respective one of each of the multiple authors, and (iii) associated with a respective one of each of multiple artifact types. The method also includes finding, by the hardware processor using automatic feature selection, a set of important expressions in the respective sets of problem expressions. The method additionally includes detecting, by the hardware processor, a typical tendency of the usages of the problem expressions for each of the multiple authors, based on the important expressions.

18 Claims, 9 Drawing Sheets

(51) Int. Cl.
*G06F 8/41* (2018.01)
*G06F 8/33* (2018.01)
*G06F 40/30* (2020.01)

(52) U.S. Cl.
CPC .......... *G06F 8/436* (2013.01); *G06F 16/9035* (2019.01); *G06F 40/30* (2020.01)

(58) Field of Classification Search
USPC .......................................................... 717/112
See application file for complete search history.

(56) References Cited

U.S. PATENT DOCUMENTS

| | | | | |
|---|---|---|---|---|
| 7,873,640 | B2* | 1/2011 | Chang | G06Q 30/0207 707/739 |
| 8,060,513 | B2* | 11/2011 | Basco | G06F 16/355 707/739 |
| 8,321,204 | B2* | 11/2012 | Kalyan | G06F 16/337 704/10 |
| 9,305,083 | B2* | 4/2016 | Hu | G06F 16/951 |
| 10,360,404 | B2* | 7/2019 | Gordon | G06F 40/166 |
| 2010/0005061 | A1* | 1/2010 | Basco | G06F 16/355 704/9 |
| 2010/0005446 | A1 | 1/2010 | Drissi et al. | |
| 2010/0057720 | A1* | 3/2010 | Kalyan | G06F 16/337 707/E17.017 |
| 2010/0332435 | A1 | 12/2010 | Bagley et al. | |
| 2012/0110003 | A1 | 5/2012 | Brewer et al. | |
| 2012/0254832 | A1 | 10/2012 | Aman et al. | |
| 2013/0198192 | A1* | 8/2013 | Hu | G06F 16/951 707/738 |
| 2017/0249479 | A1* | 8/2017 | Gordon | H04W 12/02 |
| 2019/0034415 | A1* | 1/2019 | Walsh | G06F 40/284 |
| 2019/0303435 | A1* | 10/2019 | Herr | G06F 40/45 |

OTHER PUBLICATIONS

Arnarsson et al, "Towards big-data analysis of deviation and error reports in product development projects", [Online], 2016, pp. 1-10, [Retrieved from internet on Mar. 26, 2021], <https://www.designsociety.org/publication/39329/Towards+big-data+analysis+of+deviation+and+error+reports+in+product+develo> (Year: 2016).*

Mekala et al., "Survey on Authorship Attribution", International Journal of Research Innovations in Computer Science, 2017, Sep. 2017, pp. 31-39 vol. 1,No. 1.

Muller et al., "Automatic Feature Selection, Chapter 4: Representing Data and Engineering Features", Introduction to Machine Learning with Python, Oct. 2016 pp. 239-241.

* cited by examiner

INDIVIDUAL DEVIATION ANALYSIS BY WARNING PATTERN DETECTION

BACKGROUND

The present invention generally relates to anomaly detection, and more particularly to individual deviation analysis by warning pattern detection.

In a large scale software development, ambiguous expressions in design documents would incur an expensive cost to fix the problem in latter stages. Hence, there is a need for individual deviation analysis for such a scenario.

SUMMARY

According to an aspect of the present invention, a computer-implemented method is provided for detecting characteristics of usages of problem expressions for each of multiple authors. The method includes providing, by a hardware processor, a set of regular expression patterns configured to detect the problem expressions. The method further includes detecting, by the hardware processor based on the set of regular expressions, respective sets of the problem expressions which are (i) used in each of multiple analysis units, (ii) associated with a respective one of each of the multiple authors, and (iii) associated with a respective one of each of multiple artifact types. The method also includes finding, by the hardware processor using automatic feature selection, a set of important expressions in the respective sets of problem expressions. The method additionally includes detecting, by the hardware processor, a typical tendency of the usages of the problem expressions for each of the multiple authors, based on the important expressions.

According to another aspect of the present invention, a computer program product is provided for detecting characteristics of usages of problem expressions for each of multiple authors. The computer program product includes a non-transitory computer readable storage medium having program instructions embodied therewith. The program instructions are executable by a computer to cause the computer to perform a method. The method includes providing, by a hardware processor, a set of regular expression patterns configured to detect the problem expressions. The method further includes detecting, by the hardware processor based on the set of regular expressions, respective sets of the problem expressions which are (i) used in each of multiple analysis units, (ii) associated with a respective one of each of the multiple authors, and (iii) associated with a respective one of each of multiple artifact types. The method also includes finding, by the hardware processor using automatic feature selection, a set of important expressions in the respective sets of problem expressions. The method additionally includes detecting, by the hardware processor, a typical tendency of the usages of the problem expressions for each of the multiple authors, based on the important expressions.

According to yet another aspect of the present invention, a computer processing system is provided for detecting characteristics of usages of problem expressions for each of multiple authors. The computer processing system includes a memory for storing program code. The computer processing system further includes a hardware processor for running the program code to provide a set of regular expression patterns configured to detect the problem expressions. The processor also runs the program code to detect, based on the set of regular expressions, respective sets of the problem expressions which are (i) used in each of multiple analysis units, (ii) associated with a respective one of each of the multiple authors, and (iii) associated with a respective one of each of multiple artifact types. The processor further runs the program code to find, using automatic feature selection, a set of important expressions in the respective sets of problem expressions. The processor additionally runs the program code to detect a typical tendency of the usages of the problem expressions for each of the multiple authors, based on the important expressions.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to individual deviation analysis by warning pattern detection.

In an embodiment, the present invention detects a typical deviation in using warning expressions for each of multiple authors (e.g., multiple software developers, etc.). As used herein, the term "warning expression" refers to an expression that tends to cause any troubles or problems in latter phases. The warning expressions are detected based on regular expression patterns. As used herein, the term "regular expression patterns" refers to a sequence of characters that define a search pattern.

In an embodiment, the present invention can receive as input documents written in natural language. In an embodiment, the present invention can process the input documents to detect the peculiarity of each software developer in terms of warning expressions usage in the documents.

Figure 1:
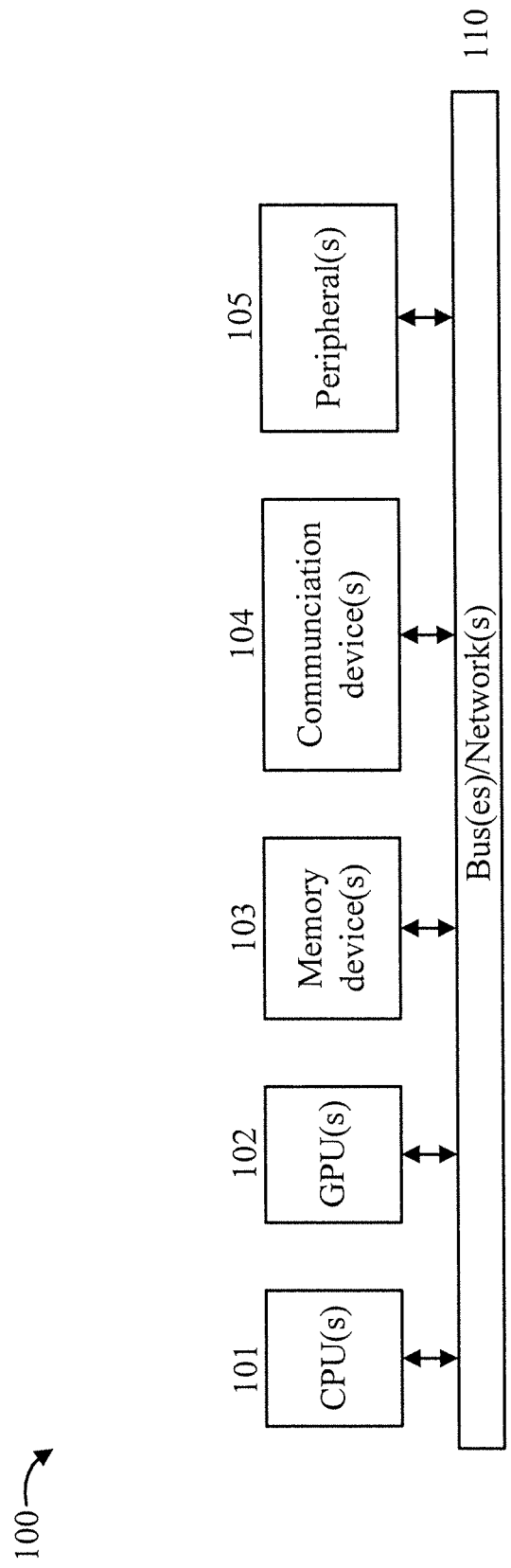
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
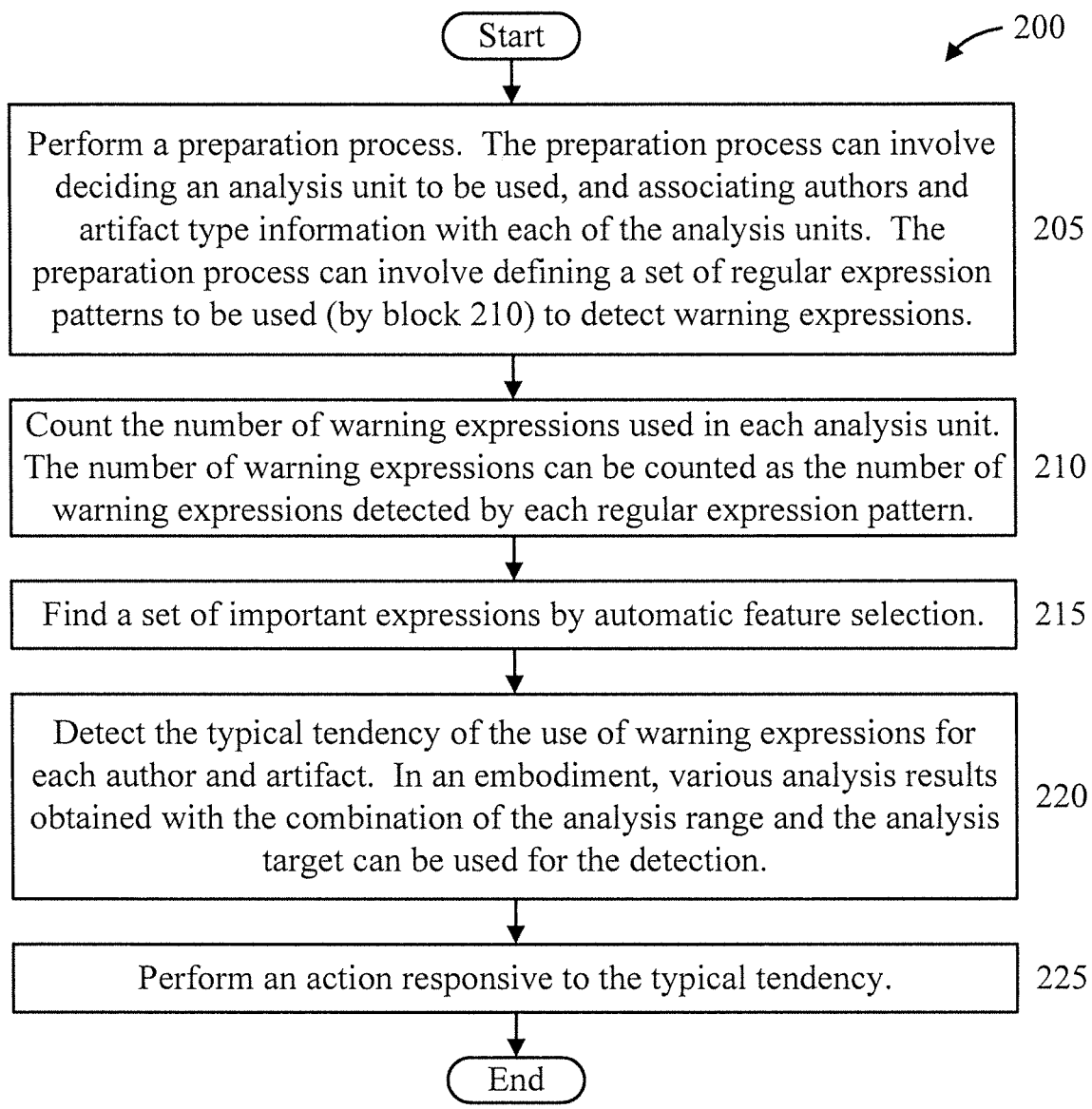
FIG. 2 is a flow diagram showing an exemplary method for individual deviation analysis by warning pattern detection, in accordance with an embodiment of the present invention.

A description will now be given regarding a method for individual deviation by warning pattern detection, in accordance with one or more embodiments of the present invention. The description will be set forth relative to FIG. 2. FIG. 2 includes blocks 205, 210, 215, 220, and 225. Thereafter, FIGS. 3, 4, 5-6, and 7-8 will further describe blocks 205, 210, 215, and 220 of FIG. 2, in accordance with one or more embodiments of the present invention.

FIG. 2 is a flow diagram showing an exemplary method 200 for individual deviation analysis by warning pattern detection, in accordance with an embodiment of the present invention.

At block 205, perform a preparation process. In an embodiment, the preparation process can involve deciding an analysis unit(s) to be used, and associating authors and artifact type information with each of the analysis units. Exemplary analysis units can include, but are not limited to, for example, a file, a sheet of a spreadsheet file, a page of a document file, a second of a document file, and so forth. Exemplary artifact type information can include, but are not limited to, a requirements specification, a basic design document, an external system interface specification, and so forth. In an embodiment, the preparation process can involve defining a set of regular expression patterns to be used (by block 210) to detect warning expressions.

At block 210, count the number of warning expressions used in each of the analysis units. In an embodiment, the number of warning expressions can be counted as the number of warning expressions detected by each regular expression pattern. An analysis unit, that can be used to count the number of warning expressions, can be associated with a developer and an artifact type. Exemplary artifact types to which the present invention can be applied include, but are not limited to, for example, a requirements specification, a basic design document, an external system interface specification, and so forth.

At block 215, find a set of important expressions by automatic feature selection. In an embodiment, an existing technique for automatic feature selection can be used to detect the important expressions, such as, for example, a model-based selection technique with a decision tree model or a linear regression model. Of course, other automatic feature selection techniques can also be used, as readily appreciated by one of ordinary skill in the art given the teachings of the present invention provided herein, while maintaining the spirit of the present invention.

At block 220, detect a typical tendency of the use of warning expressions for each author and each artifact. In an embodiment, various analysis results obtained with a combination of the analysis range and the analysis target can be used for the detection.

Various aspects of detection can be performed by the combination of the analysis range and the analysis targets, some of which are as follows:

(1) Detect the important features of an artifact to identify the artifact from all the other artifacts.

(2) Detect the important features of an author to identify the author from all the other authors.

(3) Detect the important features of an author working for an artifact to identify him/her from all the other authors working for the artifact.

Various aspects of detection can be performed by converting the original count dataset into a N-level value dataset by thresholding, some of which are as follows:

(1) Detect the important features of an author whose usage of the detected expressions is different from other authors from the point of view of frequency by using the original count data set.

(2) Detect the important features of the expressions in an author's vocabulary from the point of view of appearance by using a binary dataset.

For each detected expression, in an embodiment, averages are used by detecting whether the expression is frequently used by the author or the expression is rarely used by the author.

In an embodiment, a decision table can be used to detect the tendency from the various analysis results.

At block 225, perform an action responsive to the typical tendency. The action can be, for example, but is not limited to, providing guidance to an author to aid the author to mitigate and/or otherwise eliminate the typical tendency. As another example, the action can be an automatic correction of an undesirable result of the typical tendency. In an embodiment, the action can be performed responsive to the typical tendency exceeding a threshold.

Figure 3:
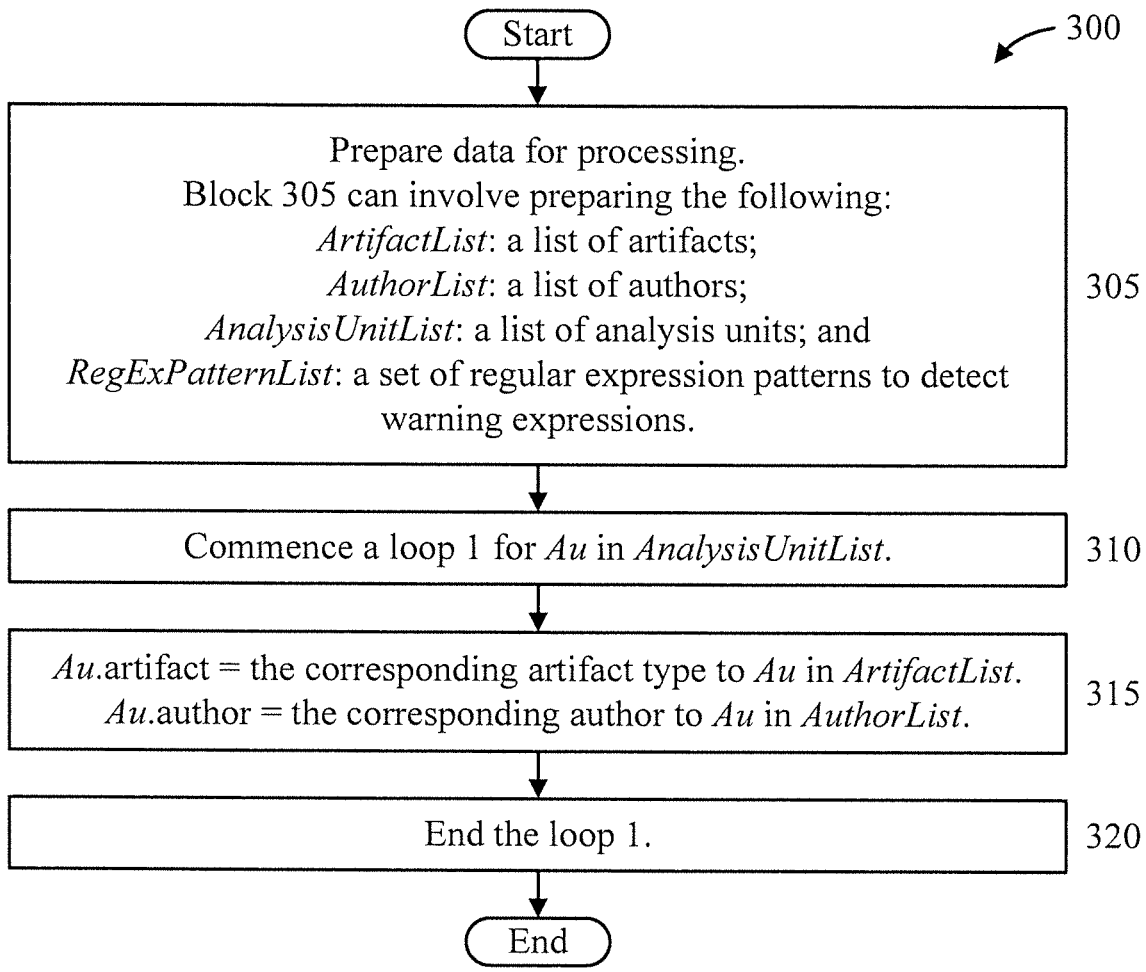
FIG. 3 is a flow diagram showing an exemplary method for data preparation for an individual deviation analysis by warning pattern detection, in accordance with an embodiment of the present invention.

FIG. 3 is a flow diagram showing an exemplary method 300 for data preparation for an individual deviation analysis by warning pattern detection, in accordance with an embodiment of the present invention. Method 300 can be considered to further described block 205 of method 200 of FIG. 2.

At block 305, prepare data for processing. In an embodiment, block 305 can be considered a pre-processing step. In an embodiment, block 305 can involve preparing the following:

ArtifactList: a list of artifacts;
AuthorList: a list of authors;
AnalysisUnitList: a list of analysis units; and
RegExPatternList: a set of regular expression patterns to detect warning expressions.

At block 310, commence a loop 1 for Au in AnalysisUnitList.

At block 315, set the following:
Au.artifact=the corresponding artifact type to Au in ArtifactList.
Au.author=the corresponding author to Au in AuthorList.

At block 320, end the loop 1.

Figure 4:
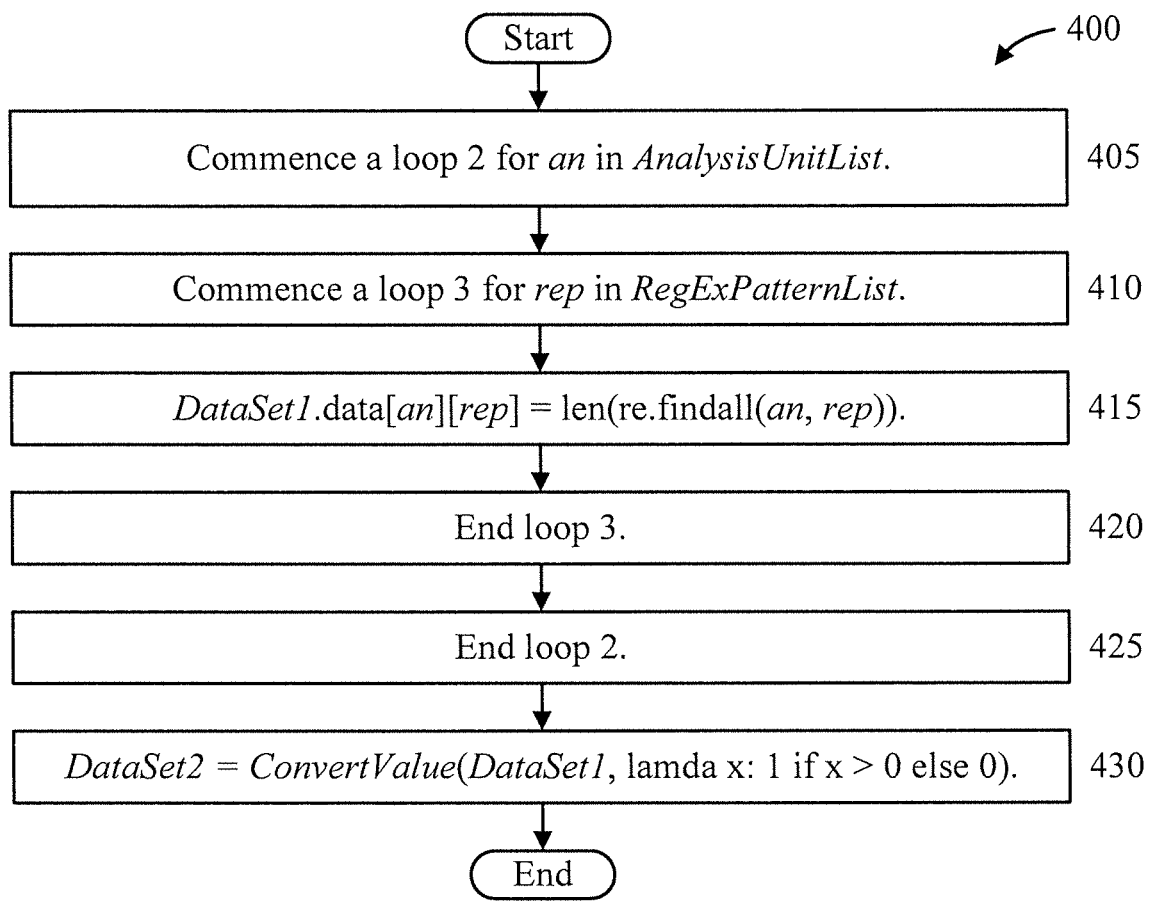
FIG. 4 is a flow diagram showing an exemplary method for detecting a set of warning expressions for an individual deviation analysis, in accordance with an embodiment of the present invention.

FIG. 4 is a flow diagram showing an exemplary method 400 for detecting a set of warning expressions for an individual deviation analysis, in accordance with an embodiment of the present invention. Method 400 can be considered to further described block 210 of method 200 of FIG. 2.

At block 405, commence a loop 2 for an in AnalysisUnitList.

At block 410, commence a loop 3 for rep in RegExPatternList.

At block 415, DataSet1.data[an][rep]=len(re.findall(an, rep)).

At block 420, end loop 3.
At block 425, end loop 2.
At block 430, DataSet2=ConvertValue(DataSet1, lamda x: 1 if x>0 else 0).

Figure 5:
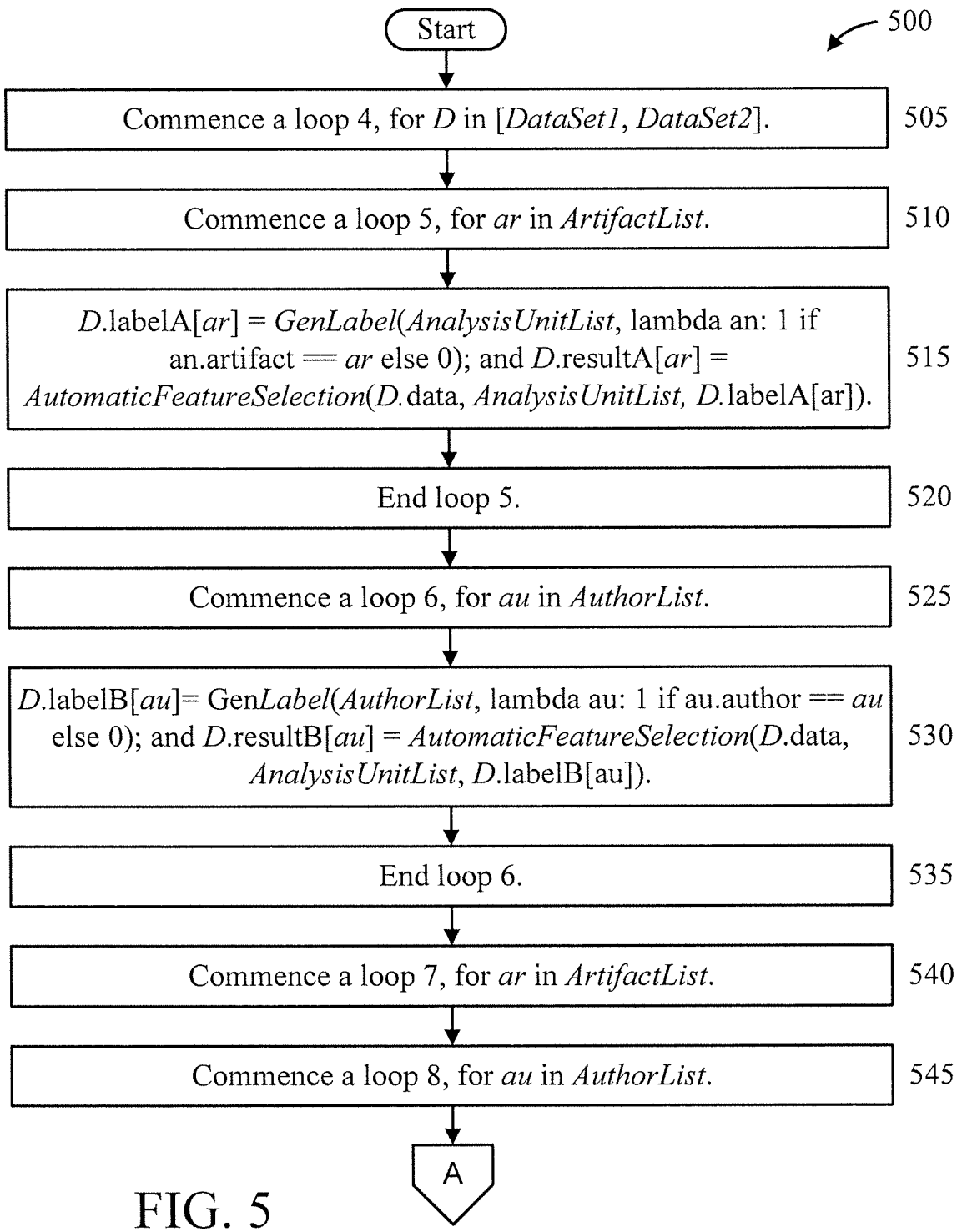
FIGS. 5-6 are flow diagrams showing an exemplary method for detecting a set of important expressions by automatic feature selection, in accordance with an embodiment of the present invention.
Figure 6:
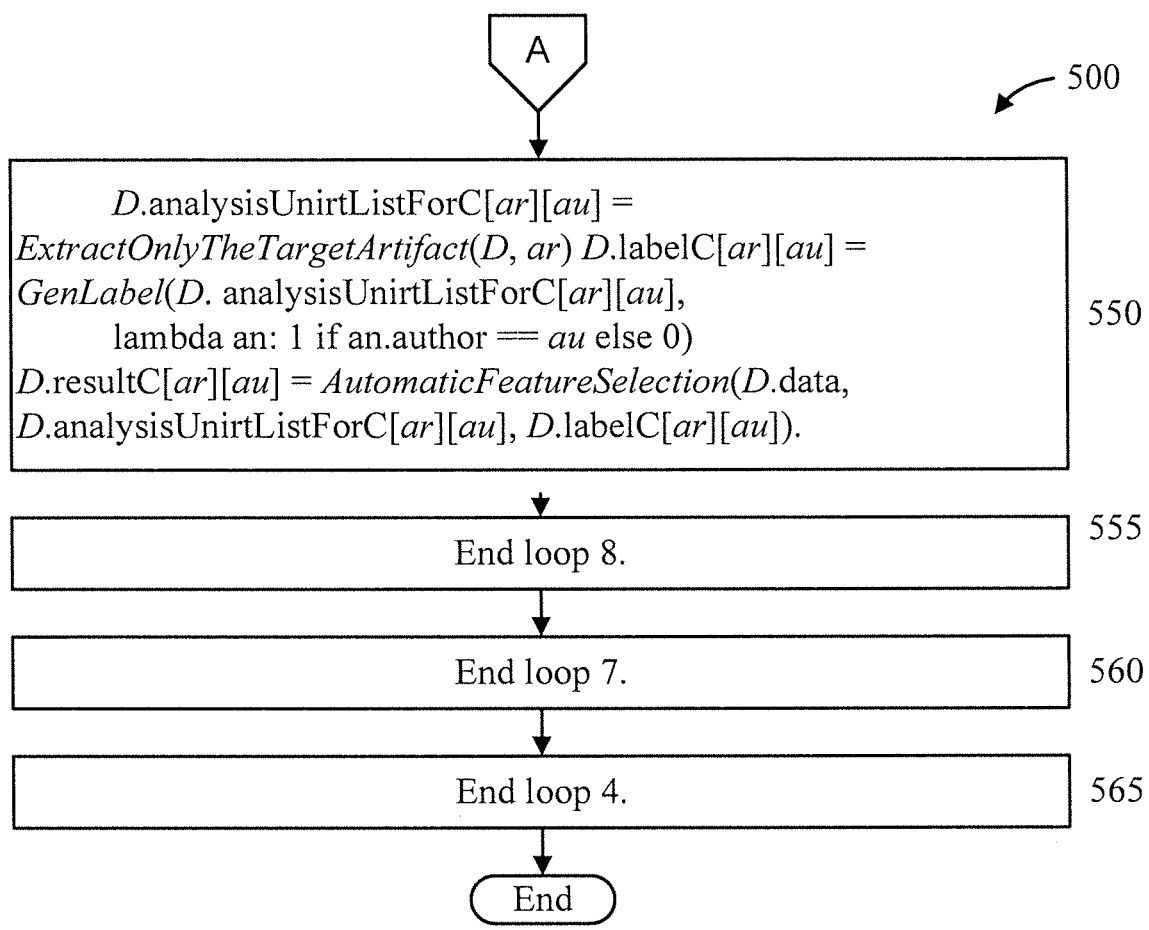

FIGS. 5-6 are flow diagrams showing an exemplary method 500 for detecting a set of important expressions by automatic feature selection, in accordance with an embodiment of the present invention. Method 500 can be considered to further described block 215 of method 200 of FIG. 2.

At block 505, commence a loop 4, for D in [DataSet1, DataSet2].

At block 510, commence a loop 5, for ar in ArtifactList.
At block 515, D.labelA[ar]=GenLabel(AnalysisUnitList, lambda an: 1 if an.artifact==ar else 0); and D.resultA[ar] =AutomaticFeatureSelection(D.data, AnalysisUnitList, D.labelA[ar]).

At block 520, end loop 5.
At block 525, commence a loop 6, for au in AuthorList.
At block 530, D.labelB[au]=GenLabel(AuthorList, lambda au: 1 if au.author==au else 0); and D.resultB [au] =AutomaticFeatureSelection(D.data, AnalysisUnitList, D.labelB[au]).

At block 535, end loop 6.
At block 540, commence a loop 7, for ar in ArtifactList.
At block 545, commence a loop 8, for au in AuthorList.
At block 550, D.analysisUnirtListForC[ar][au]=ExtractOnlyTheTargetArtifact(D, ar) D.labelC[ar][au]=GenLabel (D. analysisUnirtListForC[ar][au],
lambda an: 1 if an.author==au else 0)
D.resultC[ar][au]=AutomaticFeatureSelection(D.data, D.analysisUnirtListForC[ar][au], D.labelC[ar][au]).

At block 555, end loop 8.
At block 560, end loop 7.
At block 565, end loop 4.

Figure 7:
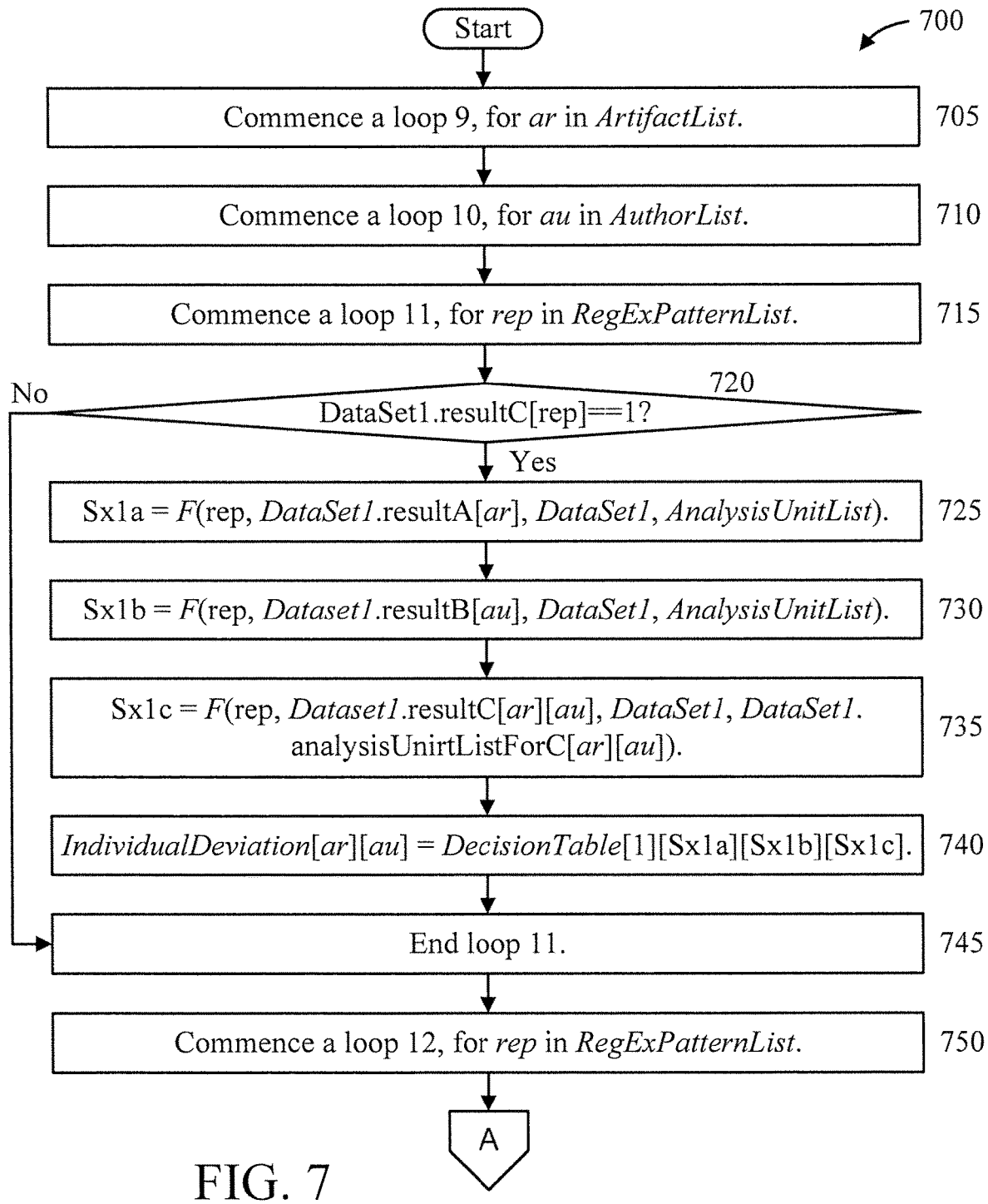
FIG. 7-8 is a flow diagram showing an exemplary method for deciding a typical tendency of the use of warning expressions, in accordance with an embodiment of the present invention.
Figure 8:
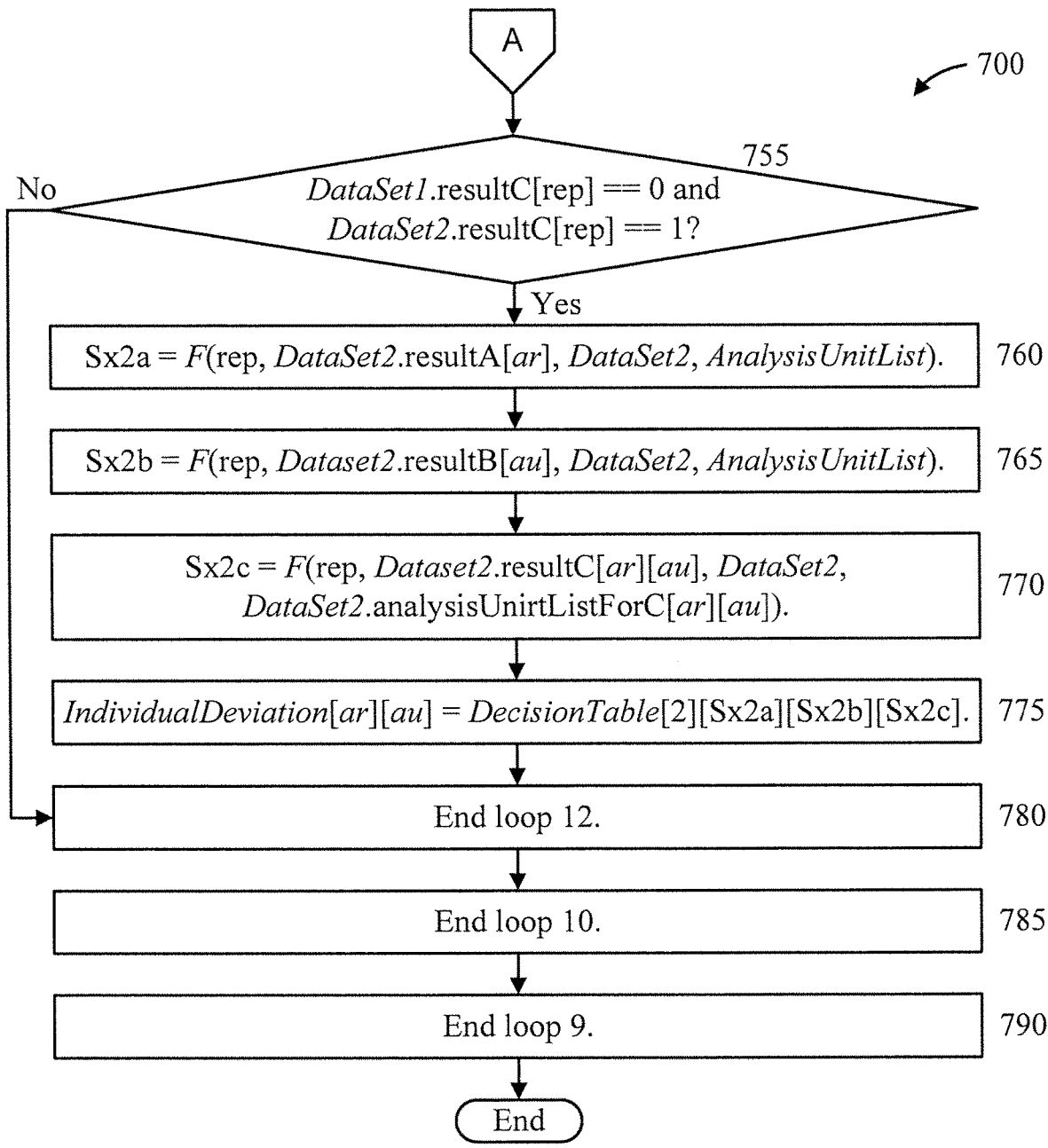

FIG. 7-8 is a flow diagram showing an exemplary method 700 for deciding a typical tendency of the use of warning expressions, in accordance with an embodiment of the present invention. Method 700 can be considered to further described block 220 of method 200 of FIG. 2.

At block 705, commence a loop 9, for ar in ArtifactList.
At block 710, commence a loop 10, for au in AuthorList.
At block 715, commence a loop 11, for rep in RegExPatternList.

At block 720, determine whether DataSet1.resultC[rep] ==1. If so, then proceed to block 725. Otherwise, proceed to block 745.

At block 725, Sx1a=F(rep, DataSet1.resultA[ar], DataSet1, AnalysisUnitList).

At block 730, Sx1b=F(rep, Dataset1.resultB[au], DataSet1, AnalysisUnitList).

At block 735, Sx1c=F(rep, Dataset1.resultC[ar][au], DataSet1, DataSet1. analysisUnirtListForC[ar][au]).

At block 740, IndividualDeviation[ar][au]=DecisionTable [1][Sx1a][Sx1b][Sx1c].

At block 745, end loop 11.
At block 750, commence a loop 12, for rep in RegExPatternList.

At block 755, determine whether DataSet1.resultC[rep] ==0 and DataSet2.resultC[rep]==1. If so, then proceed to block 760. Otherwise, proceed to block 780.

At block 760, Sx2a=F(rep, DataSet2.resultA[ar], DataSet2, AnalysisUnitList).

At block 765, Sx2b=F(rep, Dataset2.resultB[au], DataSet2, AnalysisUnitList).

At block 770, Sx2c=F(rep, Dataset2.resultC[ar][au], DataSet2, DataSet2.analysisUnirtListForC[ar][au]).

At block 775, IndividualDeviation[ar][au]=DecisionTable [2][Sx2a][Sx2b][Sx2c].

At block 780, end loop 12.
At block 785, end loop 10.
At block 790, end loop 9.

A description will now be given further regarding the methods of FIGS. 2-8, in accordance with one or more embodiments of the present invention.

Referring to FIGS. 2 and 3 further regarding preparation per block 205 and method 300, the same can involve deciding the analysis units and associating the author and artifact type information with each of the analysis units. Block 205 and method 300 can also involve preparing a set of regular expression patterns to detect the target warning expressions.

Referring to FIGS. 2 and 4 further regarding detecting the set of warning expressions per block 210 and method 400, the same can involve counting the number of warning expressions used in each analysis unit.

Accordingly, for each analysis unit (Loop 2), perform the following steps to count the number of the warning expressions:

(1—block 415) count the number of warning expressions for each regular expression pattern and store them into Dataset 1; and (2—block 430) generate another dataset (DataSet 2) of binary values from DataSet 1 by a thresholding of zero.

Referring to FIGS. 2 and 5-6, further regarding detecting the set of important expressions by automatic feature selection per block 215 and method 500, the same can involve, for each dataset (Dataset 1 and 2), the following:

(1—block 515) Detect the important expression set (A) of identifying each artifact from all the other artifacts in the all analysis units by automatic feature selection with the label of {0, 1}: 1 as the analysis unit belongs to the target artifact and 0 as otherwise.

(2—block 530) Detect the important expression set (B) of identifying each author from all the other authors in the all analysis units by automatic feature selection with the label of {0, 1}: 1 as the analysis unit is written by the target author and 0 as otherwise.

(3—block 550) Detect the important expression set (C) of identifying each author from all the other authors in the specified artifact by automatic feature selection with the label of {0, 1}: 1 as the analysis unit is written by the target author and 0 as otherwise.

Referring to FIGS. 2 and 7-8 further regarding detecting the typical tendency of the use of warning expressions per block 220 and method 700, for each author (Loop 10), apply the following steps:

(1) For each expression E (Loop 11) in the expression set C derived from Dataset 1, apply the following steps:
(a—block 725) Get the state (Sa) of E for the expression A by using of the feature state evaluation function F;
(b—block 730) Get the state (Sb) of E for the expression B by using of the feature state evaluation function F;
(c—block 735) Get the state (Sc) of E for the expression C by using of the feature state evaluation function F; and
(d) Get the result of decision table T by Sa, Sb, and Sc.
(2) For each expression E (Loop 12) in the expression set C derived from Dataset 2, apply the following steps if E is not included in the expression set C derived from Dataset 2:
(a—block 760) Get the state (Sa) of E for the expression A by using of the feature state evaluation function F;
(b—block 765) Get the state (Sb) of E for the expression B by using of the feature state evaluation function F;
(c—block 770) Get the state (Sc) of E for the expression C by using of the feature state evaluation function F; and
(d—block 775) Get the result of decision table T by Sa, Sb, and Sc, and store it as the result of E for the author.

Figure 9:
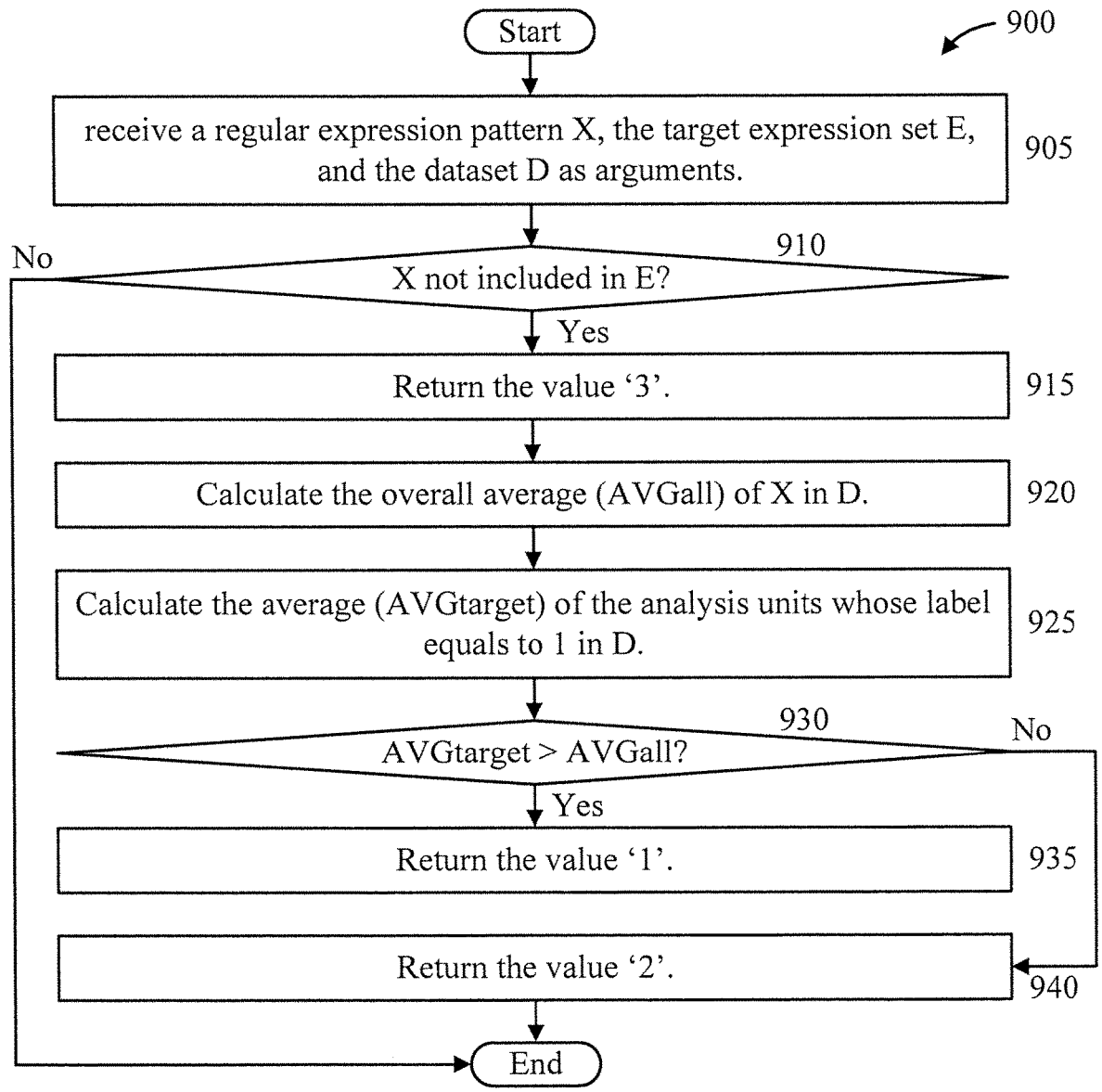
FIG. 9 is a flow diagram showing an exemplary method for feature state evaluation function F, in accordance with an embodiment of the present invention.

FIG. 9 is a flow diagram showing an exemplary method 900 for feature state evaluation function F, in accordance with an embodiment of the present invention. In particular, method 900 can be used relative to blocks 725, 730, 735, 760, 765, and 770 of method 700.

At block 905, receive a regular expression pattern X, the target expression set E, and the dataset D as arguments.

At block 910, determine if X is not included in E. If so, then proceed to block 415. Otherwise, terminate the method.

At block 915, return the value '3'.

At block 920, calculate the overall average (AVGall) of X in D.

At block 925, calculate the average (AVGtarget) of the analysis units whose label equals to 1 in D.

At block 930, determine if AVGtarget>AVGall. If so, the proceed to block 935.

Otherwise, proceed to block 940.

At block 935, return the value '1'.

At block 940, return the value '2'.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for detecting characteristics of usages of problem expressions for each of multiple authors, the method comprising:
   providing, by a hardware processor, a set of regular expression patterns configured to detect the problem expressions, wherein the set of regular expression patterns comprise a sequence of characters that define a search pattern;
   detecting, by the hardware processor based on the set of regular expression patterns, respective sets of the problem expressions which are (i) used in each of multiple analysis units, (ii) associated with a respective one of each of the multiple authors, and (iii) associated with a respective one of each of multiple artifact types;
   finding, by the hardware processor using automatic feature selection, a set of important expressions in the respective sets of problem expressions, the set of important expressions identifying any of a used analysis unit from the multiple analysis units and an actual author from the multiple authors;
   detecting, by the hardware processor, a typical tendency of the usages of the problem expressions for each of the multiple authors, based on the important expressions; and
   automatically mitigating an unwanted result of the typical tendency of the usages of the problem expressions for each of the multiple authors, using a set of rules for automatically correcting the usages of the problem expressions.

2. The computer-implemented method of claim 1, wherein the analysis unit is selected from the group consisting of an entire file and a portion of the entire file.

3. The computer-implemented method of claim 1, further comprising providing guidance to mitigate the typical tendency of the usages of the problem expressions for each of the multiple authors, based on the typical tendency.

4. The computer-implemented method of claim 1, wherein the typical tendency of the usages of the problem expressions for a given one of the multiple authors is relative to the typical tendency of the usages of the problem expressions for remaining ones of the multiple authors.

5. The computer-implemented method of claim 1, wherein detecting the typical tendency of the usages for a given author from among the multiple authors comprises:
- detecting important features of an artifact which identify the artifact from all other artifacts;
- detecting important features of the given author which identify the given author from all other ones of the multiple authors; and
- detecting important features of the given author working for an artifact to identify the given author from all other ones of the multiple authors working for the artifact.

6. The computer-implemented method of claim 1, wherein detecting the typical tendency of the usages for a given author from among the multiple authors comprises converting an original count dataset into a N-level value dataset by thresholding.

7. The computer-implemented method of claim 1, wherein detecting the typical tendency of the multiple usages for a given author from among the multiple authors further comprises:
- detecting important features of the given author whose usage of the detected expressions is different from other ones of the multiple authors from a point of view of frequency by using an original count data set.

8. The computer-implemented method of claim 1, wherein said finding step comprises using binary labels to selectively indicate membership or non-membership in a plurality of sets corresponding at least to an analysis unit from among multiple analysis units, an author from among the multiple authors, and the author relative to a given artifact from among multiple artifacts.

9. A computer program product for detecting characteristics of usages of problem expressions for each of multiple authors, the computer program product comprising a non-transitory computer readable storage medium having program instructions embodied therewith, the program instructions executable by a computer to cause the computer to perform a method comprising:
- providing, by a hardware processor, a set of regular expression patterns configured to detect the problem expressions, wherein the set of regular expression patterns comprise a sequence of characters that define a search pattern;
- detecting, by the hardware processor based on the set of regular expression patterns, respective sets of the problem expressions which are (i) used in each of multiple analysis units, (ii) associated with a respective one of each of the multiple authors, and (iii) associated with a respective one of each of multiple artifact types;
- finding, by the hardware processor using automatic feature selection, a set of important expressions in the respective sets of problem expressions, the set of important expressions identifying any of a used analysis unit from the multiple analysis units and an actual author from the multiple authors;
- detecting, by the hardware processor, a typical tendency of the usages of the problem expressions for each of the multiple authors, based on the important expressions; and
- automatically mitigating, by the hardware processor an unwanted result of the typical tendency of the usages of the problem expressions for each of the multiple authors, using a set of rules for automatically correcting the usages of the problem expressions.

10. The computer program product of claim 9, wherein the analysis unit is selected from the group consisting of an entire file and a portion of the entire file.

11. The computer program product of claim 9, wherein the method further comprises providing guidance to mitigate the typical tendency of the usages of the problem expressions for each of the multiple authors, based on the typical tendency.

12. The computer program product of claim 9, wherein the typical tendency of the usages of the problem expressions for a given one of the multiple authors is relative to the typical tendency of the usages of the problem expressions for remaining ones of the multiple authors.

13. The computer program product of claim 9, wherein detecting the typical tendency of the usages for a given author from among the multiple authors comprises:
- detecting important features of an artifact which identify the artifact from all other artifacts;
- detecting important features of the given author which identify the given author from all other ones of the multiple authors; and
- detecting important features of the given author working for an artifact to identify the given author from all other ones of the multiple authors working for the artifact.

14. The computer program product of claim 9, wherein detecting the typical tendency of the usages for a given author from among the multiple authors comprises converting an original count dataset into a N-level value dataset by thresholding.

15. The computer program product of claim 9, wherein detecting the typical tendency of the multiple usages for a given author from among the multiple authors further comprises:
- detecting important features of the given author whose usage of the detected expressions is different from other ones of the multiple authors from a point of view of frequency by using an original count data set.

16. The computer program product of claim 9, wherein said finding step comprises using binary labels to selectively indicate membership or non-membership in a plurality of sets corresponding at least to an analysis unit from among multiple analysis units, an author from among the multiple authors, and the author relative to a given artifact from among multiple artifacts.

17. A computer processing system for detecting characteristics of usages of problem expressions for each of multiple authors, the computer processing system comprising:
- a memory storing program code; and
- a hardware processor for running the program code to
- provide a set of regular expression patterns configured to detect the problem expressions, wherein the set of regular expression patterns comprise a sequence of characters that define a search pattern;
- detect, based on the set of regular expressions, respective sets of the problem expression patterns which are (i) used in each of multiple analysis units, (ii) associated with a respective one of each of the multiple authors, and (iii) associated with a respective one of each of multiple artifact types;
- find, using automatic feature selection, a set of important expressions in the respective sets of problem expressions, the set of important expressions identifying any of a used analysis unit from the multiple analysis units and an actual author from the multiple authors;
- detect a typical tendency of the usages of the problem expressions for each of the multiple authors, based on the important expressions; and
- automatically mitigate an unwanted result of the typical tendency of the usages of the problem expressions for each of the multiple authors, using a set of rules for automatically correcting the usages of the problem expressions.

18. The computer processing system of claim 17, wherein the analysis unit is selected from the group consisting of an entire file and a portion of the entire file.

* * * * *